(12) United States Patent
Seo et al.

(10) Patent No.: US 12,302,950 B2
(45) Date of Patent: May 20, 2025

(54) AEROSOL GENERATING DEVICE AND METHOD FOR CONTROLLING SAME

(71) Applicant: KT&G CORPORATION, Daejeon (KR)

(72) Inventors: Jang Won Seo, Daejeon (KR); Gyoung Min Go, Daejeon (KR); Jin Chul Jung, Seoul (KR); Min Seok Jeong, Seoul (KR); Jong Seong Jeong, Gyeonggi-do (KR); Chul Ho Jang, Gyeonggi-do (KR); Yong Joon Jang, Daejeon (KR)

(73) Assignee: KT&G CORPORATION, Daejeon (KR)

(*) Notice: Subject to any disclaimer, the term of this patent is extended or adjusted under 35 U.S.C. 154(b) by 1034 days.

(21) Appl. No.: 17/253,351

(22) PCT Filed: Jul. 2, 2019

(86) PCT No.: PCT/KR2019/008020
§ 371 (c)(1),
(2) Date: Dec. 17, 2020

(87) PCT Pub. No.: WO2020/009412
PCT Pub. Date: Jan. 9, 2020

(65) Prior Publication Data
US 2021/0251299 A1   Aug. 19, 2021

(30) Foreign Application Priority Data
Jul. 4, 2018   (KR) ........................ 10-2018-0077889

(51) Int. Cl.
*A24F 40/57* (2020.01)
*A24F 40/20* (2020.01)
(Continued)

(52) U.S. Cl.
CPC .............. *A24F 40/57* (2020.01); *A24F 40/20* (2020.01); *A24F 40/53* (2020.01);
(Continued)

(58) Field of Classification Search
CPC .......... A24F 40/20; A24F 40/53; A24F 40/50; G05D 23/1917; H05B 1/0244; H05B 1/02; H02J 7/0063
See application file for complete search history.

(56) References Cited

U.S. PATENT DOCUMENTS 9,949,507 B2   4/2018   Flick
10,194,697 B2  2/2019   Fernando et al.
(Continued)

FOREIGN PATENT DOCUMENTS

CN   104768407 A1 *  7/2015   ............. A24F 40/42
CN   106413444 A  *  2/2017   ............. A24F 40/51
(Continued)

OTHER PUBLICATIONS

Machine translation of WO 2017219360 A1 performed on Nov. 7, 2023, Liu et al. (Year: 2017).*
(Continued)

*Primary Examiner* — Dana Ross
*Assistant Examiner* — Kevin Guanhua Wen
(74) *Attorney, Agent, or Firm* — Sughrue Mion, PLLC (57) ABSTRACT

An aerosol generating device measures a current temperature of a heater before power is supplied to the heater that heats an aerosol generating material, and sets a preheating completion parameter, based on the measured current temperature of the heater, and a value of an amount of heat required to be supplied to the aerosol generating material to generate an adequate amount of aerosol. The aerosol generating device controls power supplied to the heater, based on the preheating completion parameter, such that a value of
(Continued)

an amount of heat supplied to the aerosol generating material by the heater reaches the value of the amount of heat required to be supplied to the aerosol generating material.

9 Claims, 9 Drawing Sheets

(51) Int. Cl.
*A24F 40/53* (2020.01)
*G05D 23/19* (2006.01)
*H05B 1/02* (2006.01)
*H02J 7/00* (2006.01)

(52) U.S. Cl.
CPC ....... *G05D 23/1917* (2013.01); *H05B 1/0244* (2013.01); *H02J 7/0063* (2013.01)

(56) References Cited

U.S. PATENT DOCUMENTS

| | | | |
|---|---|---|---|
| 11,246,341 B2 | 2/2022 | Han et al. | |
| 2017/0000188 A1 | 1/2017 | Nordskog et al. | |
| 2017/0042232 A1 | 2/2017 | Gorilovsky | |
| 2017/0258142 A1* | 9/2017 | Hatton et al. | A24F 47/00 |
| 2017/0265524 A1 | 9/2017 | Cadieux et al. | |
| 2017/0325507 A1 | 11/2017 | Xiang | |
| 2017/0360104 A1 | 12/2017 | Hu et al. | |
| 2018/0132526 A1* | 5/2018 | Davis et al. | A24F 47/00 |
| 2020/0093177 A1 | 3/2020 | Han et al. | |
| 2020/0120988 A1 | 4/2020 | Qiu | |

FOREIGN PATENT DOCUMENTS

| | | | |
|---|---|---|---|
| CN | 107156915 A | 9/2017 | |
| EP | 2 454 956 A1 | 5/2012 | |
| GB | 2537121 A | 10/2016 | |
| JP | 2949114 B1 | 9/1999 | |
| JP | 3696619 B2 * | 9/2005 | A24F 40/53 |
| KR | 10-2014-0094513 A | 7/2014 | |
| KR | 10-1614171 B1 | 4/2016 | |
| KR | 10-2016-0142896 A | 12/2016 | |
| KR | 10-2018-0070439 A | 6/2018 | |
| KR | 10-2018-0070440 A | 6/2018 | |
| WO | 2009/118085 A1 | 10/2009 | |
| WO | 2015/107552 A1 | 7/2015 | |
| WO | 2015/192084 A1 | 12/2015 | |
| WO | 2016/166064 A1 | 10/2016 | |
| WO | WO 2017147560 A1 * | 8/2017 | A24F 47/00 |
| WO | 2017/185355 A1 | 11/2017 | |
| WO | WO 2017219360 A1 * | 12/2017 | A24F 40/50 |
| WO | 2018/019786 A1 | 2/2018 | |
| WO | WO 2018096000 A1 * | 5/2018 | A24F 47/00 |

OTHER PUBLICATIONS

Machine translation of CN 106413444 A performed on Nov. 7, 2023, Xiang (Year: 2017).*
Machine translation of JP 3696619 B2 performed on Nov. 9, 2023, McCafferty et al. (Year: 2005).*
Machine translation of CN 104768407 A1 performed on Apr. 5, 2024, Collett et al. (Year: 2015).*
International Search Report for PCT/KR2019/008020 dated Oct. 8, 2019 (PCT/ISA/210).
Office Action dated Mar. 17, 2023 from the Chinese Patent Office in Application No. 201980043310.2.
Office Action issued Jul. 19, 2021 in Korean Application No. 10-2018-0077889.
Extended European Search Report dated Nov. 2, 2021, issued by the European Patent Office in application No. 19829781.4.

* cited by examiner

AEROSOL GENERATING DEVICE AND METHOD FOR CONTROLLING SAME

CROSS REFERENCE TO RELATED APPLICATIONS

This application is a National Stage of International Application No. PCT/KR2019/008020 filed Jul. 2, 2019, claiming priority based on Korean Patent Application No. 10-2018-0077889 filed Jul. 4, 2018.

TECHNICAL FIELD

One or more embodiments of the present disclosure relate to an aerosol generating device and a method of controlling the same.

BACKGROUND ART

In recent years, there is an increasing demand for alternative methods of overcoming the shortcomings of general cigarettes. For example, there is an increasing demand for a method of generating an aerosol by heating an aerosol generating material in a cigarette, rather than a method of generating an aerosol by burning a cigarette.

When using an aerosol generating device including a heater that heats a cigarette by using electricity, the cigarette needs to be adequately preheated by the heater in order to generate an adequate amount of aerosol from the aerosol generating material in the cigarette.

However, depending on the initial temperature of the heater, the cigarette may not be adequately preheated by the heater. Therefore, there is a need for a technique for regulating a preheating parameter by considering the initial temperature of the heater.

DESCRIPTION OF EMBODIMENTS

Technical Problem

One or more embodiments of the present disclosure provide an aerosol generating device and a method of controlling the same. The aerosol generating device according to the present embodiment may set a preheating completion parameter, based on an initial temperature of a heater. By preheating a cigarette according to the set preheating completion parameter, the aerosol generating device may supply heat to an aerosol generating material in the cigarette, such that an adequate amount of aerosol is generated even when the initial temperature of the heater changes.

Additional aspects will be set forth in part in the description which follows and, in part, will be apparent from the description, or may be learned by the practice of the presented embodiments.

Solution to Problem

The aerosol generating device according to the present embodiment may measure a current temperature of a heater before power is supplied to the heater that heats an aerosol generating material, and may set a preheating completion parameter, based on the measured current temperature of the heater, and a value of an amount of heat required to be supplied to the aerosol generating material to generate an adequate amount of aerosol. Based on the preheating completion parameter, the aerosol generating device may control power supplied to the heater, such that a value of an amount of heat supplied to the aerosol generating material by the heater reaches the value of the required amount of heat.

Advantageous Effects of Disclosure

The aerosol generating device according to the present disclosure may set a preheating completion parameter, based on an initial temperature of a heater, such that an adequate amount of aerosol is generated from an aerosol generating material at the time of the completion of preheating. Even when the initial temperature of the heater is high, the aerosol generating device according to the present disclosure may supply an adequate amount of heat to the aerosol generating material until the preheating is completed, by increasing a preheating completion temperature of the heater or extending a preheating completion time.

BEST MODE

According to an aspect of the present disclosure, a method of controlling an aerosol generating device includes: measuring a current temperature of a heater before power is supplied to the heater that heats an aerosol generating material; setting a preheating completion parameter, based on the measured current temperature of the heater, and a value of an amount of heat required to be supplied to the aerosol generating material to generate an adequate amount of aerosol; and controlling power supplied to the heater, based on the preheating completion parameter, such that a value of an amount of heat supplied to the aerosol generating material by the heater reaches the value of the required amount of heat.

According to another aspect of the present disclosure, an aerosol generating device includes: a heater configured to heat an aerosol generating material; a battery configured to supply power to the heater; and a controller, wherein the controller measures a current temperature of the heater before power is supplied to the heater, sets a preheating completion parameter, based on the measured current temperature of the heater, and a value of an amount of heat required to be supplied to the aerosol generating material to generate an adequate amount of aerosol, and controls power supply from the battery to the heater, based on the preheating completion parameter such that a value of an amount of heat supplied to the aerosol generating material by the heater reaches the value of the required amount of heat.

According to another aspect of the present disclosure, a computer-readable recording medium has recorded thereon a computer program for executing the method according to the one aspect of the present disclosure.

MODE OF DISCLOSURE

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the accompanying drawings.

Figure 1:
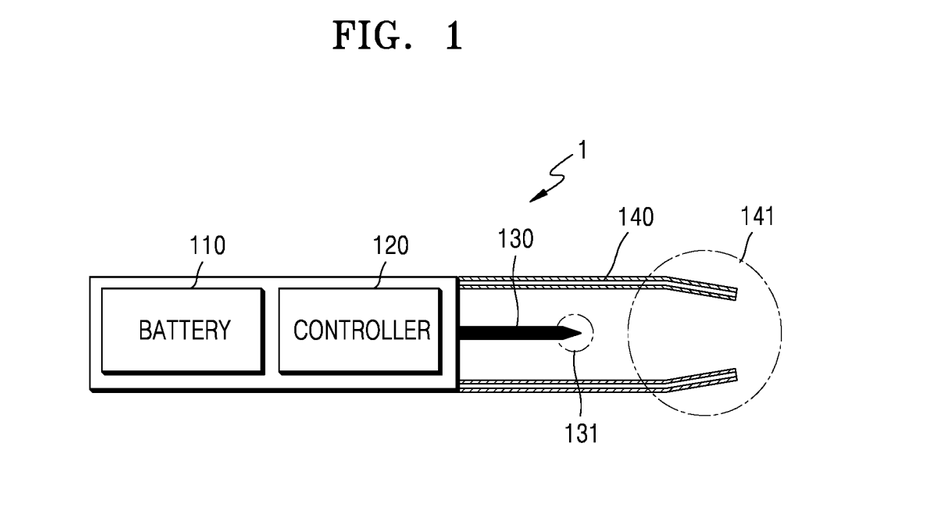
FIG. 1 is a block diagram showing an example of an aerosol generating device.

FIG. 1 is a block diagram showing an example of an aerosol generating device.

Referring to FIG. 1, an aerosol generating device 1 (hereinafter, referred to as a 'holder') includes a battery 110, a controller 120, and a heater 130. The holder 1 also includes an inner space formed by a case 140. A cigarette may be inserted into the inner space of the holder 1.

Only components related to the present embodiment are shown in the holder 1 shown in FIG. 1. Therefore, it may be understood by those of ordinary skill in the art related to the present embodiment that other general-purpose components in addition to the components shown in FIG. 1 may be further included in the holder 1.

When the cigarette is inserted into the holder 1, the holder 1 heats the heater 130. The temperature of an aerosol generating material in the cigarette is increased by the heated heater 130, thereby generating an aerosol. The generated aerosol is delivered to a user through a filter of the cigarette. Still, even when the cigarette is not inserted into the holder 1, the holder 1 may heat the heater 130, for example, to clean the heater 130.

The case 140 may be moved between a first position and a second position. For example, when the case 140 is in the first position, the user may insert the cigarette into the holder 1 to inhale the aerosol. On the other hand, when the case 140 is in the second position, the user may remove (separate) the cigarette from the holder 1. As the user pushes or pulls the case 140, the case 140 may be moved between the first position and the second position. In addition, the case 140 may be completely separated from the holder 1 by the user's manipulation.

Moreover, the diameter of a hole formed by an end 141 of the case 140 may be made smaller than the diameter of a space formed by the case 140 and the heater 130, and in that case, the hole may serve as a guide for the cigarette inserted into the holder 1.

The battery 110 supplies power used for the holder 1 to operate. For example, the battery 110 may supply power for the heater 130 to be able to be heated, and may supply power required for the controller 120 to operate. In addition, the battery 110 may supply power required for a display, sensor, motor, and the like installed in the holder 1 to operate.

The battery 110 may be a lithium iron phosphate (LiFePO4) battery. However, embodiments of the present disclosure are not limited to thereto. For example, the battery 110 may be a lithium cobalt oxide (LiCoO2) battery, a lithium titanate battery, or the like.

Whether the battery 110 is fully charged or completely discharged may be determined based on a level of power stored in the battery 110 compared to the total capacity of the battery 110. For example, when the power stored in the battery 110 is 95% or more of the total capacity of the battery 110, it may be determined that the battery 110 is fully charged. In addition, when the power stored in the battery 110 is 10% or less of the total capacity of the battery 110, it may be determined that the battery 110 is completely discharged. However, the criteria for determining whether the battery 110 is fully charged or completely discharged is not limited to the above-described example.

The heater 130 is heated by power supplied by the battery 110. When the cigarette is inserted into the holder 1, the heater 130 is located inside the cigarette. Therefore, the heated heater 130 may increase the temperature of the aerosol generating material in the cigarette.

The heater 130 may be manufactured in a shape in which the heater 130 may be easily inserted into the cigarette. For example, the heater 130 may have a blade form or a shape in which a cylinder and a cone are combined to each other. However, embodiments of the present disclosure are not limited thereto. In addition, only a portion of the heater 130 may be heated. For example, only a first portion of the heater 130 may be heated and a second portion of the heater 130 may not be heated. Here, the first portion may be a portion in which a cigarette rod is located when the cigarette is inserted into the holder 1. Moreover, the heater 130 may be heated to a different temperature for each portion. For example, the above-described first and second portions may be heated to different temperatures.

The heater 130 may be an electric resistive heater. For example, the heater 130 may be manufactured such that an electrically conductive track is disposed on a substrate formed of an electrically insulating material. Here, the substrate may be made of a ceramic material, and the electrically conductive track may be made of tungsten. However, embodiments of the present disclosure are not limited thereto.

A separate temperature detection sensor may be provided in the holder 1. Alternatively, the holder 1 may not be provided with a temperature detection sensor, and the heater 130 may serve as a temperature detection sensor. Alternatively, while the heater 130 of the holder 1 serves as a temperature detection sensor, a separate temperature detection sensor may be further provided in the holder 1. In order for the heater 130 to serve as a temperature detection sensor, the heater 130 may include at least one electrically conductive track to detect heat generation or temperature. In addition, the heater 130 may separately include a second electrically conductive track to detect temperature in addition to a first electrically conductive track to detect heat generation.

For example, when a voltage applied to the electrically conductive track and a current flowing through the electrically conductive track are measured, resistance R may be determined. In that case, temperature T of the electrically conductive track may be determined by Equation 1 below.

$$R = R_c(1 - \alpha(T - T_c))$$ [Equation 1]

In Equation 1, R refers to a current resistance value of the electrically conductive track, $R_0$ refers to a resistance value at temperature $T_0$ (e.g., 0° C.), and a refers to a resistance temperature coefficient of the electrically conductive track. Since a conductive material (e.g., metal) has an intrinsic resistance temperature coefficient, $\alpha$ may be predetermined depending on the conductive material constituting the electrically conductive track. Therefore, when the resistance R of the electrically conductive track is determined, the temperature T of the electrically conductive track may be calculated by Equation 1 above.

The electrically conductive track includes an electrically resistive material. As an example, the electrically conductive track may be made of a metallic material. As another example, the electrically conductive track may be made of an electrically conductive ceramic material, carbon, a metal alloy, or a composite material of a ceramic material and a metal.

In addition, the holder 1 may include both the electrically conductive track that serves as a temperature detection sensor, and the temperature detection sensor.

The controller 120 controls the overall operation of the holder 1. More specifically, the controller 120 controls the operation of not only the battery 110 and the heater 130, but also other components included in the holder 1. In addition, the controller 120 may check states of each of the components of the holder 1 to determine whether or not the holder 1 is in an operable state.

The controller 120 includes at least one processor. The processor may be implemented as an array of a plurality of logic gates, or may be implemented as a combination of a general-purpose microprocessor and a memory in which a program executable in the microprocessor is stored. In addition, it may be understood by those of ordinary skill in the art that the processor may be implemented with other types of hardware.

For example, the controller 120 may control the operation of the heater 130. The controller 120 may control an amount of power supplied to the heater 130 and a time at which power is supplied to the heater 130 such that the heater 130 is heated to a certain temperature or maintains an appropriate temperature. In addition, the controller 120 may check the state of the battery 110 (e.g., remaining capacity of the battery 110, etc.) and generate a notification signal, if necessary.

The controller 120 may also check the presence or absence of a puff of the user and the intensity of the puff, and may count the number of puffs. Moreover, the controller 120 may continue to check a time during which the holder 1 is operating. The controller 120 may also check whether or not a cradle 2 to be described later is coupled to the holder 1, and may control the operation of the holder 1 depending on the coupling or separation of the cradle 2 and the holder 1.

The holder 1 may further include general-purpose components in addition to the battery 110, the controller 120, and the heater 130.

For example, the holder 1 may include a display capable of outputting visual information, or a motor to output tactile information. As an example, when the holder 1 includes the display, the controller 120 may transmit, to the user through the display, information on a state of the holder 1 (for example, availability of the holder 1, etc.), information on the heater 13 (for example, start of preheating, progress of preheating, completion of preheating, etc.), information related to the battery 110 (for example, remaining capacity of the battery 110, availability of the battery 110, etc.), information related to resetting of the holder 1 (for example, timing for resetting, progress of resetting, completion of resetting, etc.), information related to cleaning of the holder 1 (for example, timing for cleaning, need of cleaning, progress of cleaning, completion of cleaning, etc.), information related to charging of the holder 1 (for example, need of charging, progress of charging, completion of charging, etc.), information related to puffs (for example, the number of puffs, notice of puff termination, etc.), information related to safety (for example, elapse of use time, etc.), or the like. As another example, when the motor is included in the holder 1, the controller 120 may generate a vibration signal by using the motor to transmit the above-described information to the user.

In addition, the holder 1 may include at least one input device (e.g., a button) through which the user may control the function of the holder 1 and/or a terminal coupled to the cradle 2. For example, the user may use the input device of the holder 1 to execute various functions. The user may regulate the number of times (e.g., once, twice, etc.) for which the user presses the input device, or a time (e.g., 0.1 seconds, 0.2 seconds, etc.) during which the user presses the input device to execute the desired function of multiple functions of the holder 1. As the user operates the input device, the holder 1 may perform a function of preheating the heater 130, a function of regulating the temperature of the heater 130, a function of cleaning the space into which the cigarette is inserted, a function of checking whether or not the holder 1 is in an operable state, a function of displaying the remaining capacity (available power) of the battery 110, a function of resetting the holder 1, and the like. However, functions of the holder 1 are not limited thereto.

For example, the holder 1 may clean the space into which the cigarette is inserted by controlling the heater 130 as follows. For example, the holder 1 may heat the heater 130 to a temperature high enough to clean the space into which the cigarette is inserted. Here, the temperature high enough refers to a temperature suitable for cleaning the space into which the cigarette is inserted. For example, the holder 1 may heat the heater 130 to the highest temperature among a temperature range within which an aerosol may be generated from the inserted cigarette and a temperature range within which the heater 130 is preheated. However, embodiments of the present disclosure are not limited thereto.

In addition, the holder 1 may maintain the temperature of the heater 130 at a temperature high enough for a certain period of time. Here, the certain period of time refers to a time period sufficient for the space into which the cigarette is inserted to be cleaned. For example, the holder 1 may maintain the temperature of the heater 130 heated for an appropriate time period of 10 seconds to 10 minutes. However, embodiments of the present disclosure are not limited thereto. Preferably, holder 1 may maintain the temperature of the heater 130 heated for an appropriate time period selected from within a range of 20 seconds to 1 minute. Alternatively, the holder 1 may maintain the temperature of the heater 130 heated for an appropriate time period selected from within a range of 20 seconds to 1 minute and 30 seconds.

As the holder 1 heats the heater 130 to a temperature high enough and maintains the temperature of the heater 130 heated for a certain time period, material deposited on a surface of the heater 130 and/or in the space into which the cigarette is inserted is volatilized, thereby cleaning the holder 1.

The holder 1 may also include a puff detection sensor, a temperature detection sensor and/or a cigarette insertion detection sensor. For example, the puff detection sensor may be implemented by a general pressure sensor. Alternatively, the holder 1 may detect a puff through a change in the resistance of the electrically conductive track included in the heater 130 without including a separate puff detection sensor. Here, the electrically conductive track includes an electrically conductive track for heat generation and/or an electrically conductive track for temperature detection. Alternatively, the holder 1 may further include a puff detection sensor separately from detecting a puff by using the electrically conductive track included in the heater 130.

The cigarette insertion detection sensor may be implemented by a general capacitive sensor or a resistance sensor. In addition, the holder 1 may be manufactured in a structure in which air may flow in from the outside and flow out even when the cigarette is inserted.

Figure 2:
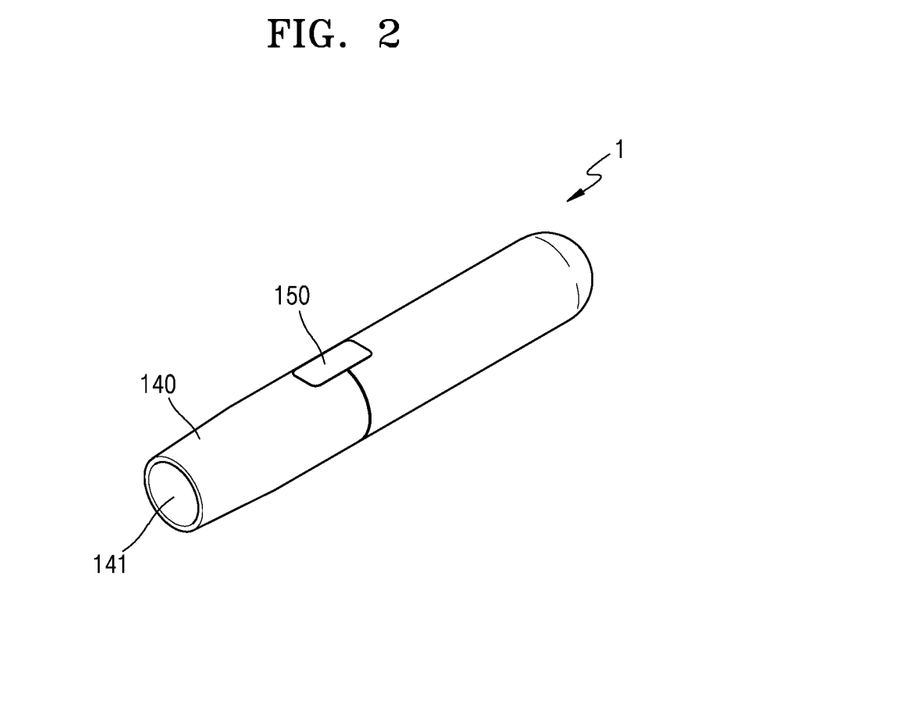
FIG. 2 is a diagram showing an example of a holder.

FIG. 2 is a diagram showing an example of a holder.

As shown in FIG. 2, the holder 1 may be manufactured in a cylindrical shape. However, embodiments of the present disclosure are not limited thereto. The case 140 of the holder 1 may be moved or separated by a user's motion, and a cigarette may be inserted into the end 141 of the case 140. In addition, the holder 1 may include a button 150 through which the user is able to control the holder 1. If necessary, the holder 1 may further include a display on which an image is output.

Figure 3:
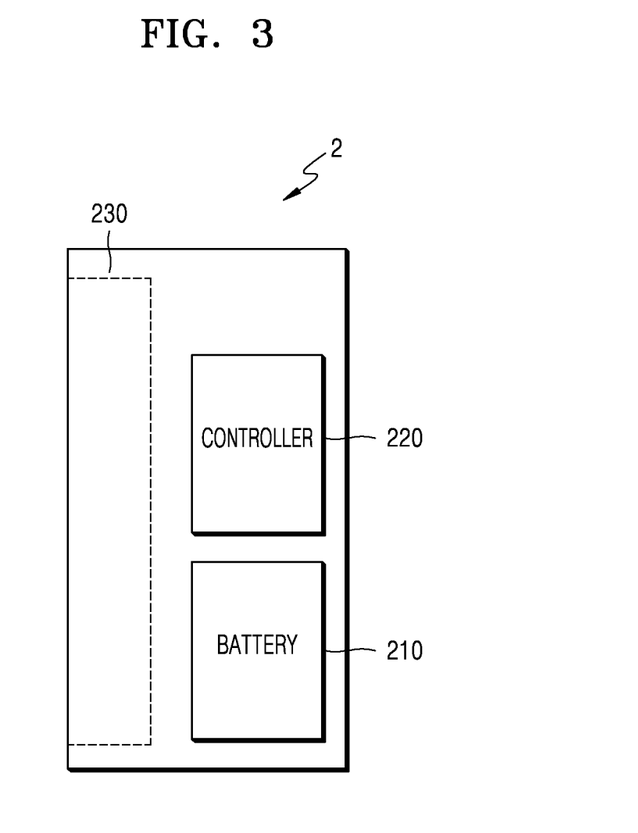
FIG. 3 is a block diagram showing an example of a cradle.

FIG. 3 is a block diagram showing an example of a cradle.

Referring to FIG. 3, the cradle 2 includes a battery 210 and a controller 220. The cradle 2 also includes an inner space 230 into which the holder 1 may be inserted. Depending on the design of the cradle 2, the cradle 2 may or may not include a separate lid. As an example, even when the separate lid is not included in the cradle 2, the holder 1 may be inserted into and fixed to the cradle 2. As another example, as the lid of the cradle 2 is closed after the holder 1 is inserted into the cradle 2, the holder 1 may be fixed to the cradle 2.

Only the components related to the present embodiment are shown in the cradle 2 shown in FIG. 3. Therefore, it may be understood by those of ordinary skill in the art related to the present embodiment that other general-purpose components in addition to the components shown in FIG. 3 may be further included in the cradle 2.

The battery 210 supplies power used for the cradle 2 to operate. The battery 210 may also supply power for the battery 110 of the holder 1 to be charged. For example, when the holder 1 is inserted into the cradle 2 and a terminal of the holder 1 and a terminal of the cradle 2 are coupled to each other, the battery 210 of the cradle 2 may supply power to the battery 110 of the holder 1.

In addition, when the holder 1 and the cradle 2 are coupled to each other, the battery 210 may supply power used for the holder 1 to operate. For example, when the terminal of the holder 1 and the terminal of the cradle 2 are couple to each other, regardless of whether the battery 110 of the holder 1 being discharged or not, the holder 1 may use power supplied by the battery 210 of the cradle 2 to operate.

For example, the battery 210 may be a lithium ion battery. However, embodiments of the present disclosure are not limited thereto. In addition, the capacity of the battery 210 may be greater than that of the battery 110.

The controller 220 controls the overall operation of the cradle 2. The controller 220 may control the operation of all components of the cradle 2. In addition, the controller 220 may determine whether the holder 1 and the cradle 2 are coupled to each other, and may control the operation of the cradle 2 depending on the coupling or separation of the cradle 2 and the holder 1.

For example, when the holder 1 and the cradle 2 are coupled to each other, the controller 220 may supply power of the battery 210 to the holder 1 to charge the battery 110 or heat the heater 130. Therefore, even when the remaining capacity of the battery 110 is small, a user may continue to smoke by coupling the holder 1 to the cradle 2

The controller 220 may include at least one processor. The processor may be implemented as an array of a plurality of logic gates, or may be implemented as a combination of a general-purpose microprocessor and a memory in which a program executable in the microprocessor is stored. In addition, it may be understood by those of ordinary skill in the art that the processor may be implemented with other types of hardware.

The cradle 2 may further include general-purpose components in addition to the battery 210 and the controller 220. For example, the cradle 2 may include a display capable of outputting visual information. For example, when the display is included in the cradle 2, the controller 220 may generate a signal to be displayed on the display to provide the user with information related to the battery 210 (e.g., remaining capacity, availability, and the like of the battery 210), information related to reset of the cradle 2 (e.g., a time for resetting, progress of resetting, completion of resetting, and the like), information related to cleaning of the holder 1 (e.g., cleaning timing, need of cleaning, cleaning progress, cleaning completion, and the like), information related to charging of the cradle 2 (e.g., need of charging, charging progress, charging completion, and the like), and the like.

In addition, the cradle 2 may include at least one input device (for example, a button) through which the user is able to control the function of the cradle 2, a terminal coupled to the holder 1, and/or an interface (for example, USB port, etc.) to charge the battery 210.

For example, the user may execute various functions by using the input device of the cradle 2. The user may regulate the number of times for which the user presses the input device or a time during which the user presses the input device to execute the desired function of multiple functions of the cradle 2. As the user operates the input device, the cradle 2 may perform a function of preheating the heater 130, a function of regulating the temperature of the heater 130, a function of cleaning the space into which the cigarette is inserted, a function of checking whether or not the cradle 2 is in an operable state, a function of displaying the remaining capacity (available power) of the battery 210, a function of resetting the cradle 2, and the like. However, functions of the cradle 2 are not limited thereto.

Figure 4A:
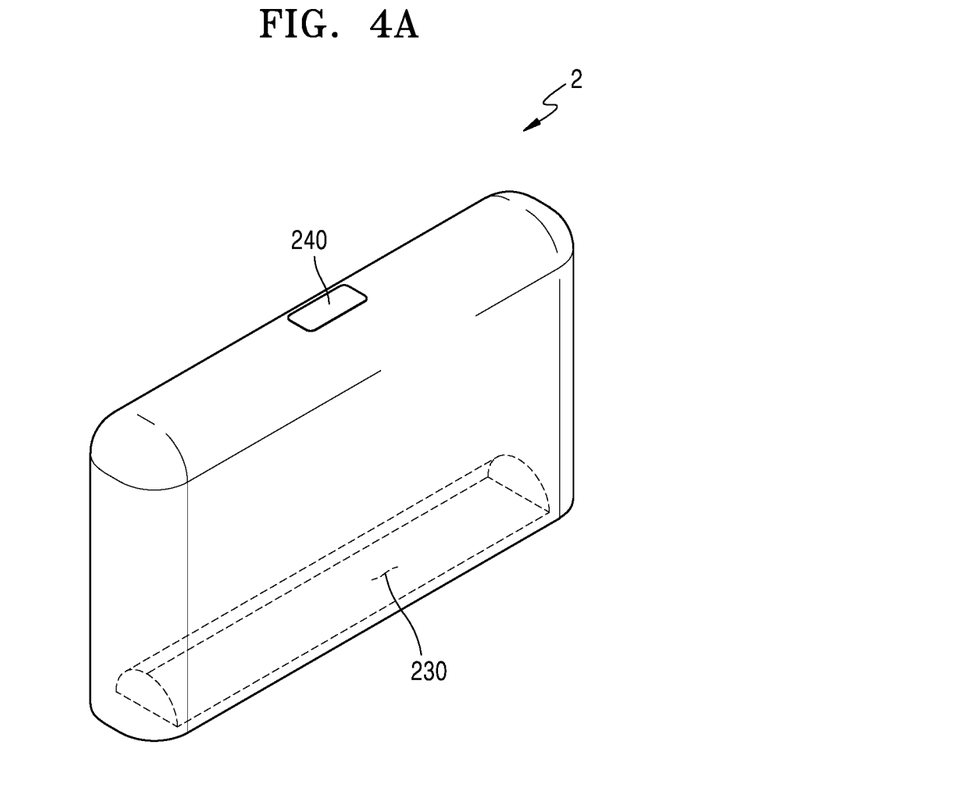
FIGS. 4A and 4B are diagrams showing examples of a cradle.
Figure 4B:
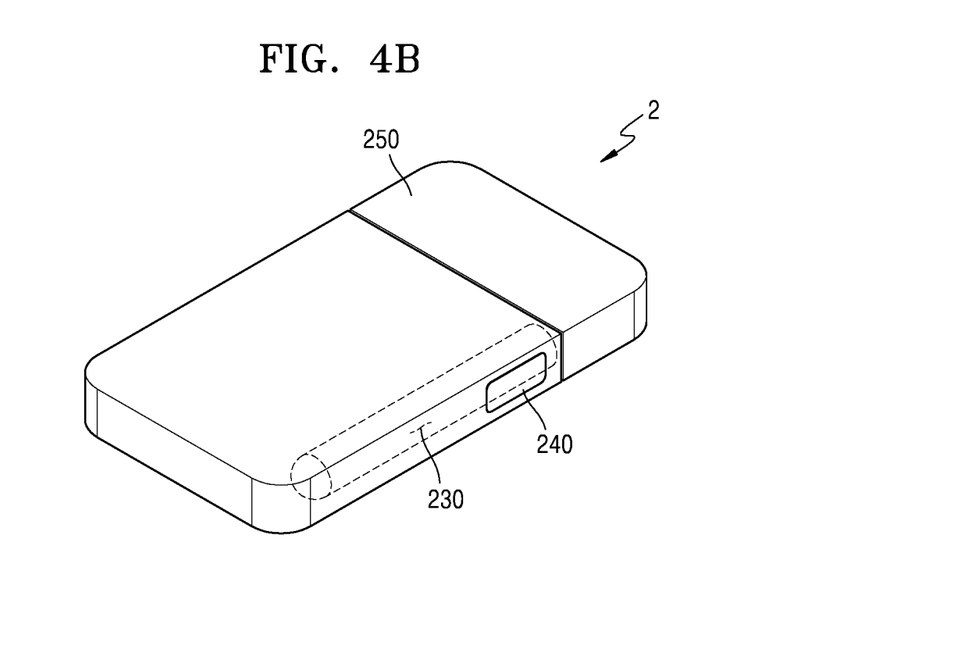

FIGS. 4A and 4B are diagrams showing examples of a cradle.

FIG. 4A shows an example of the cradle 2 not including a lid. For example, the space 230 into which the holder 1 may be inserted may be present on one side of the cradle 2. Even when the cradle 2 does not include a separate fixing means such as a lid, the holder 1 may be inserted into and fixed to the cradle 2. In addition, the cradle 2 may include a button 240 through which a user is able to control the cradle 2. The cradle 2 may further include a display on which an image is output, if necessary.

FIG. 4B shows an example of the cradle 2 including a lid. For example, as the holder 1 is inserted into the inner space 230 of the cradle 2 and a lid 250 is closed, the holder 1 may be fixed to the cradle 2.

Figure 5:
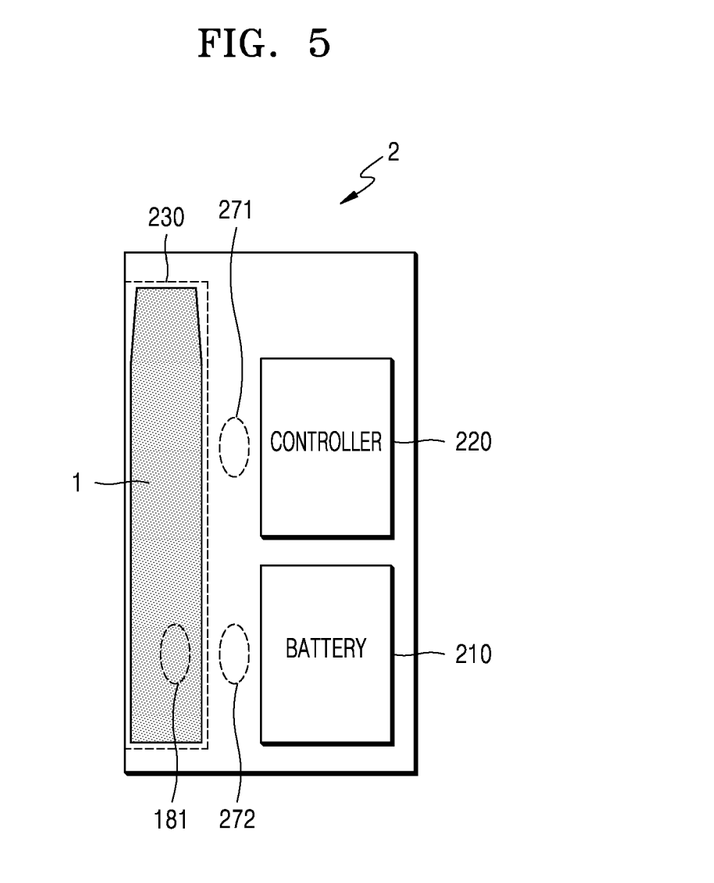
FIG. 5 is a diagram showing an example in which a holder is inserted into a cradle.

FIG. 5 is a diagram showing an example in which a holder is inserted into a cradle.

FIG. 5 shows an example in which the holder 1 is inserted into the cradle 2. Since the space 230 into which the holder 1 is to be inserted is present on one side of the cradle 2, the inserted holder 1 may not be exposed to the outside by other sides of the cradle 2. Therefore, the cradle 2 may not include other components (e.g., a lid) to not expose the holder 1 to the outside.

The cradle 2 may include at least one coupling member 271 or 272 to increase coupling intensity with the holder 1. In addition, the holder 1 may include at least one coupling member 181. Here, the coupling members 181, 271, and 272 may correspond to magnets. However, embodiments of the present disclosure are not limited thereto. For convenience of description, it is shown that the holder 1 includes one coupling member 181 and the cradle 2 includes two coupling members 271 and 272 in FIG. 5, but the number of coupling members 181, 271, and 272 is not limited thereto.

The holder 1 may include the coupling member 181 in a first position, and the cradle 2 may include coupling members 271 and 272 in a second position and a third position, respectively. In that case, the first position and the third position may face each other when the holder 1 is inserted into the cradle 2.

As the holder 1 and the cradle 2 include the coupling members 181, 271, and 272, even when the holder 1 is inserted into one side of the cradle 2, the holder 1 and the cradle 2 may be coupled to each other more firmly than before. In other words, as the holder 1 and the cradle 2 further include the coupling members 181, 271, and 272 in addition to terminals, the holder 1 and the cradle 2 may be coupled to each other more firmly than before. Therefore, even when the cradle 2 does not include a separate component (e.g., a lid), the inserted holder 1 may not be easily separated from the cradle 2.

In addition, when it is determined that the holder 1 is completely inserted into the cradle 2 by the terminals and/or the coupling members 181, 271, and 272, the controller 220 may use power of the battery 210 to charge the battery 110 of the holder 1.

Figure 6:
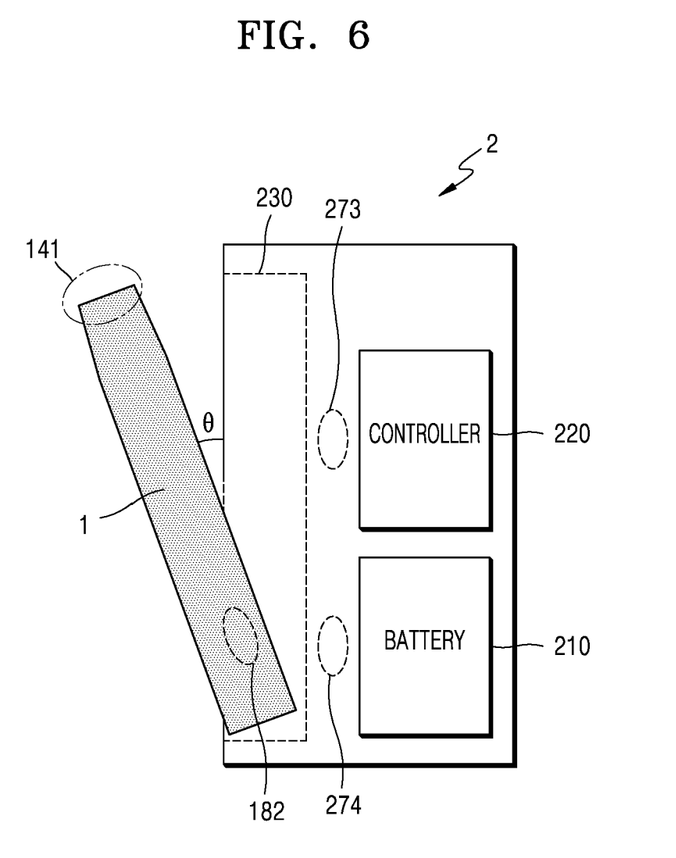
FIG. 6 is a diagram showing an example in which a holder is tilted while being inserted into a cradle.

FIG. 6 is a diagram showing an example in which a holder is tilted while being inserted into a cradle.

FIG. 6 shows that the holder 1 is tilted inside the cradle 2. Here, "tilt" refers to that the holder 1 is inclined at a certain angle while being inserted into the cradle 2.

As shown in FIG. 5, when the holder 1 is completely inserted into the cradle 2, a user cannot smoke. In other words, when the holder 1 is completely inserted into the cradle 2, a cigarette is unable to be inserted into the holder 1. Therefore, when the holder 1 is completely inserted into the cradle 2, the user cannot smoke.

As shown in FIG. 6, when the holder 1 is tilted, the end 141 of the holder 1 is exposed to the outside. Thus, the user may insert the cigarette into the end 141 and inhale (smoke) a generated aerosol. When the cigarette is inserted into the end 141 of the holder 1, a tilt angle θ may be adequately angled, such that the cigarette is not bent or damaged. For example, the holder 1 may be tilted at a minimum angle at which an entire cigarette insertion hole included in the end 141 is exposed to the outside or an angle larger than that. For example, the range of the tilt angle θ may be more than 0° and 180° or less, and it is desirable that the range of the tilt angle θ be 5° or more and 90° or less. It is more desirable that the range of the tilt angle θ be 5° or more and 20° or less, 5° or more and 30° or less, 5° or more and 40° or less, 5° or more and 50° or less, or 5° or more and 60° or less. It is most desirable that the tilt angle θ be 10°.

In addition, even when the holder 1 is tilted, a terminal of the holder 1 and a terminal of the cradle 2 are coupled to each other. Therefore, the heater 130 of the holder 1 may be heated by power supplied by the battery 210 of the cradle 2. Therefore, even when the remaining capacity of the battery 110 of the holder 1 is small or none, the holder 1 may use the battery 210 of the cradle 2 to generate an aerosol.

FIG. 6 shows an example in which the holder 1 includes one coupling member 182 and the cradle 2 includes two coupling members 273 and 274. For example, positions of each of the coupling members 182, 273, and 274 are as described above with reference to FIG. 5. Assuming that the coupling members 182, 273, and 274 are magnets, magnet intensity of the coupling member 274 may be greater than that of the coupling member 273. Therefore, even when the holder 1 is tilted, the holder 1 may not be completely separated from the cradle 2 thanks to the coupling members 182 and 274.

Moreover, when it is determined that the holder 1 is tilted by the terminals and/or the coupling members 182, 273, and 274, the controller 220 may use power of the battery 210 to heat the heater 130 of the holder 1 or charge the battery 110.

Figure 7:
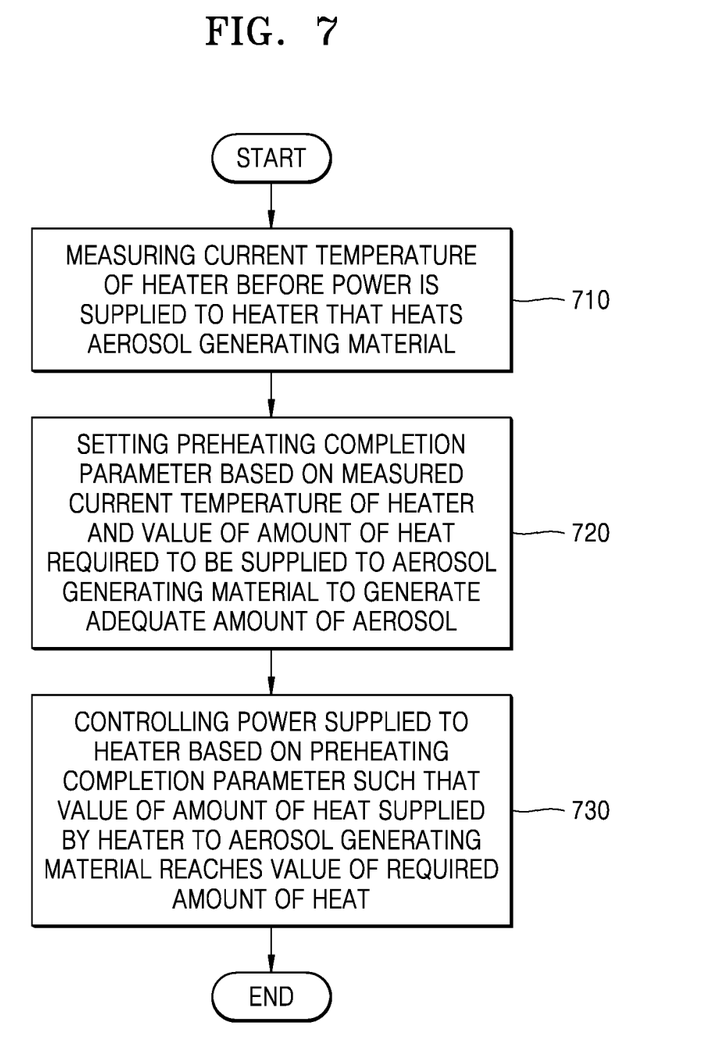
FIG. 7 is a flowchart of a method of controlling an aerosol generating device, according to an embodiment.

FIG. 7 is a flowchart of a method of controlling an aerosol generating device, according to an embodiment.

Referring to FIG. 7, in operation 710, the aerosol generating device may measure a current temperature of a heater before power is supplied to the heater that heats an aerosol generating material.

The aerosol generating device may measure the current temperature of the heater before power is supplied from a battery to the heater by using a temperature detection sensor. According to an embodiment, the aerosol generating device may be provided with a separate temperature detection sensor. Alternatively, the aerosol generating device may not be provided with a temperature detection sensor, and the heater may serve as a temperature detection sensor. Alternatively, the aerosol generating device may be further provided with a separate temperature detection sensor while the heater serves as a temperature detection sensor. For example, in order for the heater to serve as a temperature detection sensor, the heater may include at least one electrically conductive track for heat generation or temperature detection. In addition, the heater may separately include a second electrically conductive track for temperature detection in addition to a first electrically conductive track for heat generation.

Before power is supplied to the heater, the current temperature of the heater may be different from time to time.

The temperature of the heater in the aerosol generating device placed at room temperature for a certain period of time may maintain room temperature. On the other hand, the current temperature of the heater may be maintained at a temperature higher than room temperature in various situations, such as when the aerosol generating device is left in a vehicle for a certain period of time or more in summer, or continuous smoking is performed using the aerosol generating device.

In general, a preheating completion temperature for preheating a cigarette may be set in anticipation of a case where an initial temperature of the heater is a specific temperature (e.g., room temperature). However, when the preheating completion temperature of the heater is set without considering the current temperature of the heater, if the current temperature of the heater is maintained at a high temperature, a time required for the temperature of the heater to reach the preheating completion temperature may be shortened. That is, in order for the aerosol generating material to be heated by the heater to generate an adequate amount of aerosol, an amount of heat to be supplied to the aerosol generating material needs to be at least a certain amount. However, as the current temperature of the heater is maintained at a high temperature, the time required for the temperature of the heater to reach the preheating completion temperature is shortened. As a result, a required amount of heat may not be supplied to the aerosol generating material, and thus an adequate amount of aerosol may not be generated even when preheating is completed.

In operation 720, the aerosol generating device may set a preheating completion parameter based on the measured current temperature of the heater, and a value of an amount of heat required to be supplied to the aerosol generating material to generate an adequate amount of aerosol.

The aerosol generating device may set the preheating completion parameter, based on the current temperature of the heater, and may supply the required amount of heat to the aerosol generating material, based on the preheating completion parameter set to generate an adequate amount of aerosol.

According to an embodiment, the aerosol generating device may obtain a preset initial temperature of the heater. The preset initial temperature of the heater may be stored in a memory of the aerosol generating device, and a controller of the aerosol generating device may obtain the preset initial temperature of the heater from the memory. For example, the preset initial temperature of the heater may be room temperature (i.e., 25° C.), but is not limited thereto.

The aerosol generating device may compare the measured current temperature of the heater with the preset initial temperature of the heater to set the preheating completion parameter. The preheating completion parameter may include at least one of the preheating completion temperature and a preheating completion time.

According to an embodiment, the aerosol generating device may compare the measured current temperature of the heater with the preset initial temperature of the heater, and may increase the preheating completion temperature when the measured current temperature of the heater is higher than the preset initial temperature of the heater. In addition, when the measured current temperature of the heater is higher than the preset initial temperature of the heater, the aerosol generating device may extend the preheating completion time. Moreover, when the measured current temperature of the heater is higher than the preset initial temperature of the heater, the aerosol generating device may increase the preheating completion temperature and extend a preheating maintenance time.

That is, by increasing the preheating completion temperature or extending the preheating maintenance time, the aerosol generating device may control power supply from a battery to the heater, such that the required amount of heat is supplied to the aerosol generating material even when the current temperature of the heater is maintained at a high temperature.

According to an embodiment, the aerosol generating device may use a lookup table stored in a memory to set the preheating completion parameter. The lookup table in which preheating completion parameters (e.g., the preheating completion temperature and/or the preheating completion time) for each initial temperature of the heater are matched may be stored in the memory. The aerosol generating device may measure the current temperature of the heater by using the temperature sensor, and may obtain the preheating completion parameter matching the current temperature of the heater from the memory. The aerosol generating device may control power supply from the battery to the heater, based on the preheating completion parameter obtained from the lookup table.

In operation 730, the aerosol generating device may control power supplied to the heater, such that a value of an amount of heat supplied to the aerosol generating material by the heater reaches the value of the required amount of heat, based on the preheating completion parameter.

According to an embodiment, as described later in FIGS. 8 to 10, when the aerosol generating material is heated by the heater, the value of the amount of heat supplied to the aerosol generating material may be calculated based on the current temperature of the heater, the preheating completion temperature, and the time required for the temperature of the heater to reach the preheating completion temperature.

In addition, the aerosol generating device may calculate the value of the amount of heat supplied to the aerosol generating material by the heater by measuring the capacity of the battery. The aerosol generating device may further include a battery capacity measurement integrated circuit (IC), and may calculate the value of the amount of heat supplied to the heater, based on power amount data of the battery capacity measurement IC.

When the value of the amount of heat supplied to the aerosol generating material reaches the value of the required amount of heat, the aerosol generating device may output a preheating completion signal through an interface. For example, the aerosol generating device may use a display or lamp that outputs visual information, a motor that outputs tactile information, and a speaker that outputs sound information to output the preheating completion signal. A user may check the preheating completion signal output from the aerosol generating device to start smoking.

Figure 8:
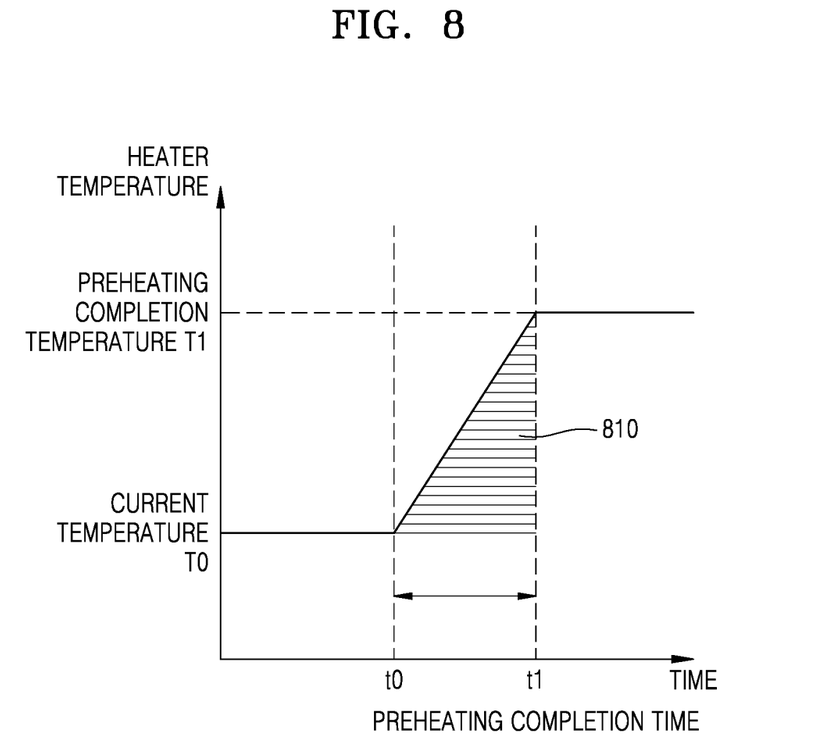
FIG. 8 is a diagram showing an example of calculating a value of an amount of heat supplied to an aerosol generating material, according to an embodiment.

FIG. 8 is a diagram showing an example of calculating a value of an amount of heat supplied to an aerosol generating material, according to an embodiment.

When the aerosol generating material is heated by a heater, the value of the amount of heat supplied to the aerosol generating material may be calculated based on a current temperature of the heater, a preheating completion temperature, and a time taken for a temperature of the heater to reach the preheating completion temperature.

Referring to FIG. 8, before power is supplied to the heater of an aerosol generating device, the current temperature of the heater is $T_0$. The current temperature $T_0$ of the heater may be room temperature (e.g., 25° C.). The preheating completion temperature $T_1$ may be a certain temperature between 300° C. and 600° C. The heater's preheating starts from time to, and the heater's preheating completion time is time $t_1$. For example, time $(t_1-t_0)$ required for the current temperature of the heater to reach the preheating completion temperature may be time between 20 seconds and 40 seconds.

In FIG. 8, the value of the amount of heat supplied to the aerosol generating material is an area value 810. More specifically, the area value 810 is a value obtained by dividing by 2 a value obtained by multiplying a value obtained by subtracting the current temperature $T_0$ of the heater from the preheating completion temperature $T_1$ of the heater by the time take for preheating $(t_1-t_0)$. That is, the area value 810 determined according to the preheating completion time $t_1$ and the preheating completion temperature $T_1$ represents the value of the amount of heat supplied to the aerosol generating material. When the value of the amount of heat supplied to the aerosol generating material reaches a value of an amount of heat required to be supplied to the aerosol generating material to generate an adequate amount of aerosol, the aerosol generating device may output a preheating completion signal. A user may start smoking after checking the preheating completion signal output from the aerosol generating device when the preheating completion time $t_1$ has elapsed.

In FIG. 8, it is shown that the heater temperature is consistently increased between $t_0$ and $t_1$, and the heater temperature is maintained at $T_1$ after $t_1$, but the heater temperature may be changed in various ways, based on a temperature profile of the heater.

Figure 9:
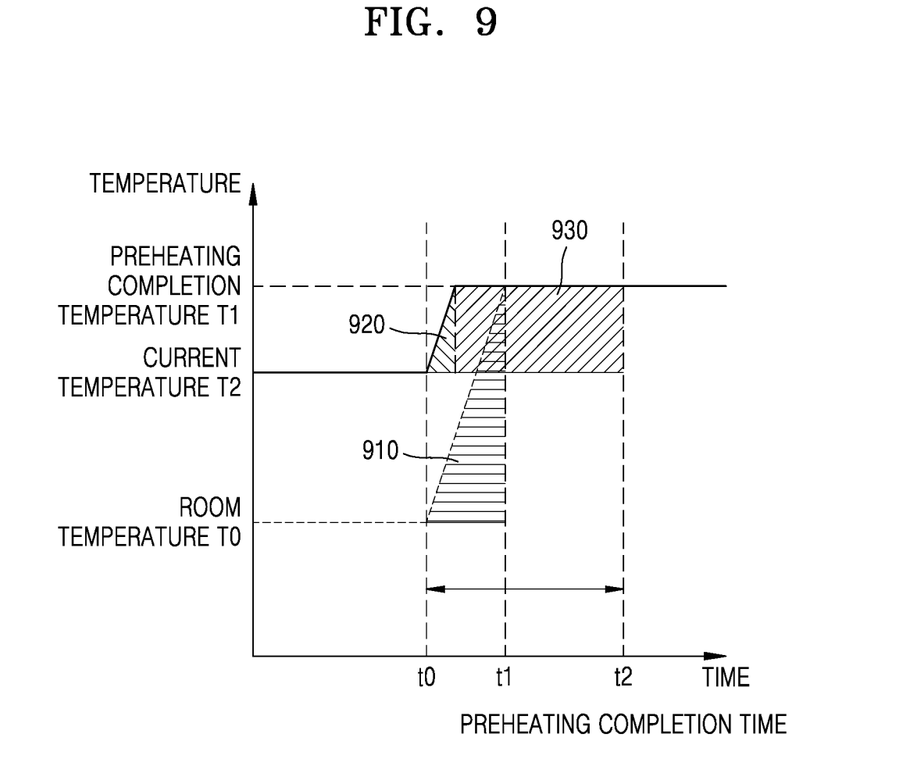
FIG. 9 is a diagram showing an example of calculating a value of an amount of heat supplied to an aerosol generating material by extending a preheating completion time, according to an embodiment.

FIG. 9 is a diagram showing an example of calculating a value of an amount of heat supplied to an aerosol generating material by extending a preheating completion time, according to an embodiment.

Referring to FIG. 9, $T_0$ is room temperature (e.g., 25° C.), and before an aerosol generating device supplies power to a heater, a current temperature $T_2$ of the heater is higher than $T_0$. For example, the current temperature $T_2$ of the heater may be 80° C. A preheating completion temperature $T_1$ may be a certain temperature between 300° C. and 600° C. The heater starts preheating from to.

When the temperature of the heater is $T_0$ before power is supplied to the heater, the value of the amount of heat supplied to the aerosol generating material is a first area value 910 until the temperature of the heater reaches the preheating completion temperature $T_1$. The first area value 910 is a value of an amount of heat required to be supplied to the aerosol generating material to generate an adequate amount of aerosol.

When the current temperature of the heater is $T_2$ before power is supplied to the heater, a time required to reach the preheating completion temperature $T_1$ is shortened. In that case, the value of the amount of heat supplied to the aerosol generating material is a second area value 920. Since the second area value 920 is less than the first area value 910, when the heater temperature is $T_2$, power is supplied to the heater. Therefore, even when the heater temperature reaches the preheating completion temperature $T_1$, the value of the amount of heat supplied to the aerosol generating material may not reach the value of the amount of heat required to be supplied to the aerosol generating material. In that case, the amount of heat applied to the aerosol production may be insufficient, and thus the amount of atomization may be insufficient or an appropriate tobacco taste may not be produced.

When the current temperature of the heater measured before power is supplied to the heater is higher than a preset initial temperature of the heater, that is, if the measured current temperature of the heater is $T_2$ and the preset initial temperature of the heater is $T_0$, the aerosol generating device may extend the preheating completion time from $t_1$ to $t_2$ while preheating the heater, such that the value of the amount of heat supplied to the aerosol generating material reaches the value of the amount of heat required to be supplied to the aerosol generating material. In that case, the value of the amount of heat supplied to the aerosol generating material is the sum of the second area value 920 and a third area value 930. That is, since the sum of the second area value 920 and the third area value 930 is equal to the first area value 910, even if the current temperature of the heater is higher than the preset initial temperature of the heater before power is supplied to the heater, the value of the amount of heat supplied to the aerosol generating material may reach the value of the amount of heat required to be supplied to the aerosol generating material during the time required for preheating $t_0-t_2$.

The aerosol generating device may calculate a value of the amount of heat supplied to the heater, based on the power amount data of the battery capacity measurement IC to determine whether or not the calculated value of the amount of heat supplied to the heater reaches the value of the required amount of heat. When the value of the amount of heat supplied to the heater reaches the value of the required amount of heat, the aerosol generating device may output a preheating completion signal through an interface.

According to an embodiment, the aerosol generating device may set the preheating completion time by using a lookup table stored in a memory. The preheating completion time according to the initial temperature of the heater may be matched and stored in the lookup table. The aerosol generating device may measure the initial temperature of the heater by using a temperature sensor, and may obtain the preheating completion time matching the initial temperature of the heater measured from the lookup table, thereby supplying power to the heater until the obtained preheating completion time.

In FIG. 9, it is shown that the heater temperature is consistently increased between $t_0$ and $t_1$, and the heater temperature is maintained at $T_1$ after $t_1$, but the heater temperature may be changed in various ways based on a temperature profile of the heater.

Figure 10:
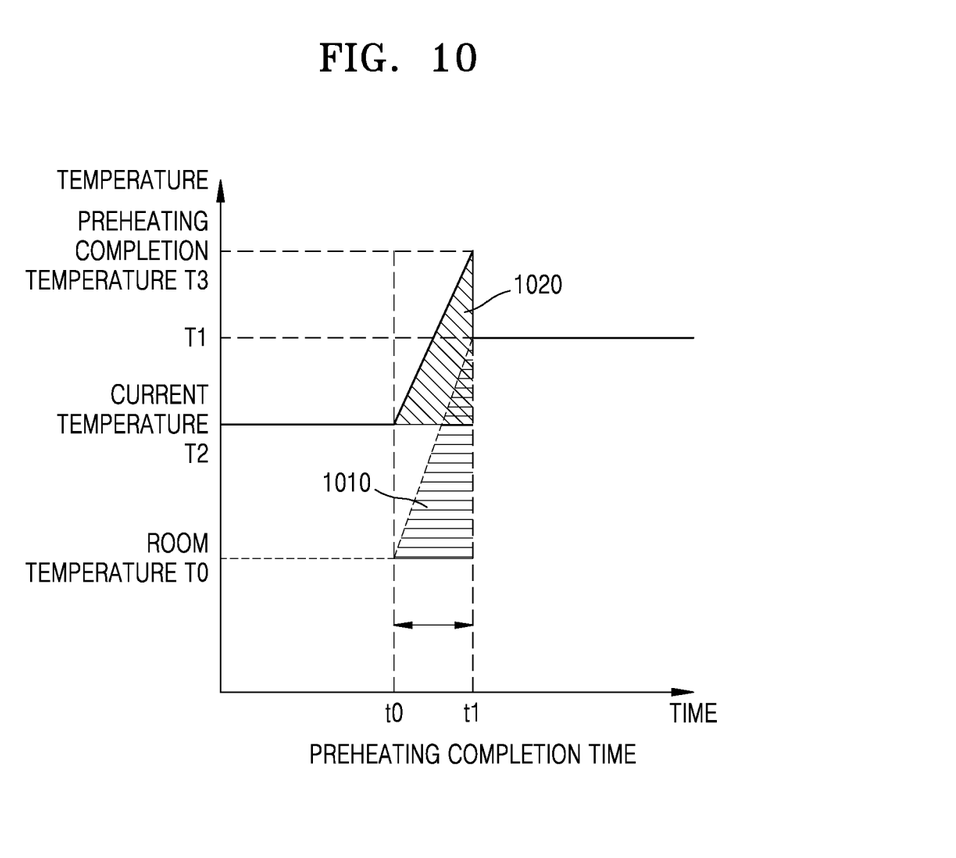
FIG. 10 is a diagram showing an example of calculating a value of an amount of heat supplied to an aerosol generating material by extending a preheating completion temperature, according to an embodiment.

FIG. 10 is a diagram showing an example of calculating a value of an amount of heat supplied to an aerosol generating material by increasing a preheating completion temperature, according to an embodiment.

Referring to FIG. 10, $T_0$ is room temperature (e.g., 25° C.), and a current temperature $T_2$ of a heater is higher than $T_0$ before an aerosol generating device supplies power to the heater. For example, the current temperature $T_2$ of the heater may be 80° C. A preheating completion temperature $T_1$ may be a certain temperature between 300° C. and 600° C. The heater starts preheating from to.

When the temperature of the heater is $T_0$ before power is supplied to the heater, a value of an amount of heat supplied to the aerosol generating material is a first area value 1010 until the temperature of the heater reaches the preheating completion temperature $T_1$. The first area value 1010 is a value of an amount of heat required to be supplied to the aerosol generating material to generate an adequate amount of aerosol.

On the other hand, when the current temperature of the heater is $T_2$ before power is supplied to the heater, the value of the amount of heat supplied to the aerosol generating material to reach the preheating completion temperature $T_1$ is less than the first area value 1010. When the heater temperature is $T_2$, power is supplied to the heater. Therefore, even when the heater temperature reaches the preheating completion temperature $T_1$, the value of the amount of heat supplied to the aerosol generating material may not reach the value of the amount of heat required to be supplied to the aerosol generating material. In that case, the amount of heat applied to the aerosol production may be insufficient, and thus the amount of atomization may be insufficient or an appropriate tobacco taste may not be produced.

When the current temperature of the heater measured before power is supplied to the heater is higher than a preset initial temperature of the heater, that is, if the measured current temperature of the heater is $T_2$ and the preset initial temperature of the heater is $T_0$, the aerosol generating device may increase the preheating completion temperature from $T_1$ to $T_2$ while preheating the heater, such that the value of the amount of heat supplied to the aerosol generating material reaches the value of the amount of heat required to be supplied to the aerosol generating material. In that case, the value of the amount of heat supplied to the aerosol generating material is a second area value 1020. That is, since the second area value 1020 is equal to the first area value 1010, even if the current temperature of the heater is higher than the preset initial temperature of the heater before power is supplied to the heater, the value of the amount of heat supplied to the aerosol generating material may reach the value of the amount of heat required to be supplied to the aerosol generating material by increasing the preheating completion temperature.

The aerosol generating device may calculate the value of the amount of heat supplied to the heater, based on the power amount data of the battery capacity measurement IC to determine whether or not the calculated value of the amount of heat supplied to the heater reaches the value of the required amount of heat. When the value of the amount of heat supplied to the heater reaches the value of the required amount of heat, the aerosol generating device may output a preheating completion signal through an interface.

According to an embodiment, the aerosol generating device may set the preheating completion temperature by using a lookup table stored in a memory. The preheating completion temperature according to the initial temperature of the heater may be matched and stored in the lookup table. The aerosol generating device may measure the initial temperature of the heater by using a temperature sensor, and may supply power to the heater such that the temperature of the heater reaches the obtained preheating completion temperature by obtaining the preheating completion temperature matching the initial temperature of the heater measured from the lookup table.

According to an embodiment, when the current temperature of the heater measured before power is supplied to the heater is higher than the preset initial temperature of the heater, the aerosol generating device may extend a preheating completion time and increase the preheating completion temperature. In that case, the preheating completion time and the preheating completion temperature according to the initial temperature of the heater may be matched and stored in the lookup table. The aerosol generating device may measure the initial temperature of the heater by using the temperature sensor, and may obtain the preheating completion time and the preheating completion temperature matching the initial temperature of the heater measured from the lookup table. The aerosol generating device may supply power to the heater, based on the obtained preheating completion time and preheating completion temperature.

In FIG. 10, it is shown that the heater temperature is consistently increased between $t_0$ and $t_1$, and the heater temperature is maintained at $T_1$ after $t_1$, but the heater temperature may be changed in various ways based on a temperature profile of the heater.

The above-described method may be written in a computer program, and may be implemented in a general-purpose digital computer that operates the computer program by using a computer-readable recording medium. In addition, the structure of data used in the above-described method may be recorded on a computer-readable recording medium through various means. The computer-readable recording medium includes storage media such as magnetic storage media (e.g., read only memory (ROM), random access memory (RAM), universal serial bus (USB), floppy disk, hard disk, etc.) and optical reading media (e.g., compact disc (CD)-ROM, digital versatile disc (DVD), etc.).

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. A method of controlling an aerosol generating device, the method comprising:
   measuring a current temperature of a heater before power is supplied to the heater that heats an aerosol generating material;
   adjusting a preset preheating completion parameter, based on the measured current temperature of the heater and a value of an amount of heat required to be supplied to the aerosol generating material to generate an adequate amount of aerosol; and
   controlling power supplied to the heater, based on the adjusted preset preheating completion parameter, such that a value of an amount of heat supplied to the aerosol generating material by the heater reaches the value of the amount of heat required to be supplied to the aerosol generating material,
   wherein the preset preheating completion parameter comprises at least one of a preheating completion temperature and a preheating completion time, and
   wherein the adjusting the preset preheating completion parameter is performed before a user's puff on the aerosol generating device is detected.

2. The method of claim 1, further comprising obtaining a preset initial temperature of the heater,
   wherein adjusting of the preset preheating completion parameter comprises:
   comparing the measured current temperature of the heater with the preset initial temperature of the heater; and
   adjusting the preset preheating completion parameter, based on the compared result.

3. The method of claim 2, wherein the adjusting of the preset preheating completion parameter comprises increasing the preheating completion temperature when the measured current temperature of the heater is higher than the preset initial temperature of the heater, based on the compared result.

4. The method of claim 2, wherein the adjusting of the preset preheating completion parameter comprises extending the preheating completion time when the measured current temperature of the heater is higher than the preset initial temperature of the heater, based on the compared result.

5. The method of claim 1, further comprising obtaining a lookup table in which preheating completion parameters for each initial temperature of the heater are matched,
wherein the adjusting of the preset preheating completion parameter comprises adjusting the preset preheating completion parameter, based on the measured current temperature of the heater and the lookup table.

6. The method of claim 1, further comprising calculating a value of the amount of heat supplied to the aerosol generating material, by measuring the capacity of a battery that supplies power to the heater.

7. The method of claim 1, further comprising outputting a preheating completion signal when the value of the amount of heat supplied to the aerosol generating material reaches the value of the amount of heat required to be supplied to the aerosol generating material.

8. An aerosol generating device comprising:
a heater configured to heat an aerosol generating material;
a battery configured to supply power to the heater; and
a controller configured to:
measure a current temperature of the heater before power is supplied to the heater,
adjust a preset preheating completion parameter, based on the measured current temperature of the heater, and a value of an amount of heat required to be supplied to the aerosol generating material to generate an adequate amount of aerosol, and
control power supplied from the battery to the heater, based on the adjusted preset preheating completion parameter, such that a value of an amount of heat supplied to the aerosol generating material by the heater reaches the value of the amount of heat required to be supplied to the aerosol generating material,
wherein the preset preheating completion parameter comprises at least one of a preheating completion temperature and a preheating completion time, and
wherein the controller adjusts the preset preheating completion parameter before a user's puff on the aerosol generating device is detected.

9. A computer-readable recording medium having recorded thereon a computer program for executing the method of claim 1.

* * * * *